United States Patent [19]

Cawley et al.

[11] 4,322,853
[45] Mar. 30, 1982

[54] NUCLEAR REACTOR CONTROL

[75] Inventors: William E. Cawley, Phoenix, Ariz.; Robert F. Warnick, Pasco, Wash.

[73] Assignee: The United States of America as represented by the United States Department of Energy, Washington, D.C.

[21] Appl. No.: 305,245

[22] Filed: Aug. 27, 1963

[51] Int. Cl.³ .............................................. G21C 7/10
[52] U.S. Cl. ................................ 376/213; 376/236; 376/333; 376/335; 376/339; 376/353
[58] Field of Search ........................ 176/36, 21, 86

[56] References Cited

U.S. PATENT DOCUMENTS

| | | | |
|---|---|---|---|
| 2,857,324 | 10/1958 | De Boisblanc et al. | 176/86 |
| 2,905,612 | 9/1959 | Borst | 176/86 |
| 3,068,161 | 12/1962 | Cawley | 176/21 |
| 3,138,536 | 6/1964 | Murray et al. | 176/86 |

*Primary Examiner*—Harvey E. Behrend
*Attorney, Agent, or Firm*—Frank H. Jackson; Roland A. Anderson; Richard G. Besha

EXEMPLARY CLAIM

1. In a nuclear reactor incorporating a plurality of columns of tubular fuel elements disposed in horizontal tubes in a mass of graphite wherein water flows through the tubes to cool the fuel elements, the improvement comprising at least one control column disposed in a horizontal tube including fewer fuel elements than in a normal column of fuel elements and tubular control elements disposed at both ends of said control column, and means for varying the horizontal displacement of the control column comprising a winch at the upstream end of the control column and a cable extending through the fuel and control elements and attached to the element at the downstream end of the column.

4 Claims, 6 Drawing Figures

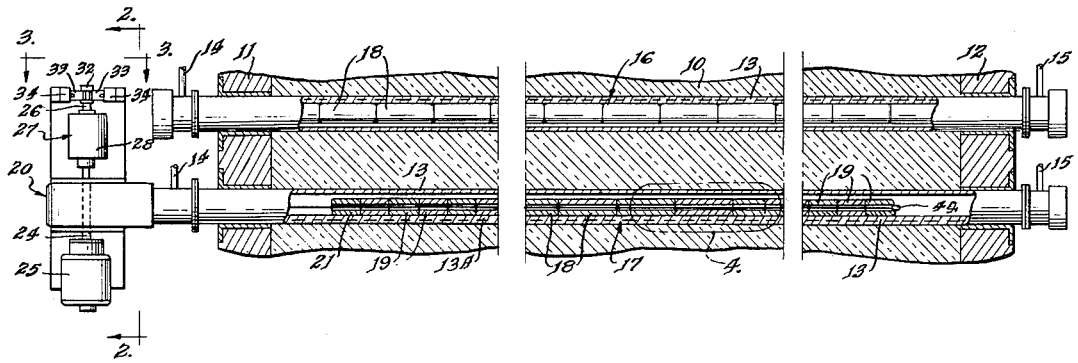

U.S. Patent   Mar. 30, 1982   4,322,853

NUCLEAR REACTOR CONTROL

This invention relates to the control of nuclear reactors and, more particularly, to the control of heat cycles in large nuclear reactors. The invention applies specifically to horizontal-column, natural-uranium, graphite-moderated, water-cooled nuclear reactors. Reactors of this general type are disclosed in U.S. Pat. No. 2,910,418 issued Oct. 27, 1959 to E. C. Creutz et al.

Natural-uranium, graphite-moderated nuclear reactors are inherently all very large in size. In such reactors localized phenomena may result in heat and flux cycles wherein a surge of heat and flux, or "hot spot", occurs at some location within the reactor and the action taken to cool off the "hot spot" results in a hot spot at some other location in the reactor.

One particular form of reactor to which the invention particularly applies which is now in operation is a graphite-moderated, water-cooled reactor operated with natural uranium as fuel for the production of plutonium. In these reactors process tubes containing the fuel extend through horizontal channels in the graphite. Cooling water passes through these process tubes over the fuel.

The horizontal channels are overbored at the front and rear of the reactor to increase the temperature of the graphite at these locations. The graphite temperature is raised near the edges of the reactor where it is normally relatively low to reduce graphite distortion due to accumulation of stored energy. Finally, control rods which extend horizontally into the reactor at right angles to the process tubes are concentrated near the center of the reactor to obtain the maximum effect therefrom.

When a reactor is operating at constant power, insertion of a control rod because of a hot spot requires withdrawal of a control rod at some other location in the reactor to maintain the power level constant. Insertion of a control rod at the hot spot causes a reduction in graphite temperature at that point. Reduction of the graphite temperature has a reactivity effect of its own independent of the control rods. Changing the graphite temperature changes the cross-section of the graphite as well as changing the thermal neutron energy. Since the graphite cools gradually, reactivity gradually decreases after movement of the control rod is completed. It is thus necessary to move the control rod out again to compensate for this decrease in reactivity.

At the same time a control rod is inserted near the hot spot, a control rod is withdrawn at another location in the reactor to maintain a constant power level. Because of the control rod withdrawal, heating occurs at this other location. The reactivity increases after a delay because of the increased graphite temperature and the control rod must be reinserted. In other words, the action taken to counter a hot spot causes a hot spot somewhere else in the reactor and the action taken to counter the second hot spot causes another hot spot at the first or another location.

The heating and cooling occurring in these heat cycles is reinforced by the xenon effect. When power is reduced in a given area, xenon-135 increases slowly since it is not being destroyed by radiation capture as fast as it is being produced by decay. This results in a further reduction in reactivity and further cooling of the graphite. Several hours later, reactivity again begins to increase, reinforcing the reactivity increase obtained by the countermovement of the control rod.

These hot spots are most noticeable near the fringe of the reactor where no control rods exist and the temperature has been artificially increased by overboring the graphite channels. A hot spot may, for example, move from the front to the rear of the reactor or the reverse, thus establishing what may be called front-to-rear heat cycles. As a result of this problem, it has been necessary at times to decrease the power level of operation of the reactor to avoid uncontrollable heat cycles. This, of course, results in decreased production of plutonium.

It is accordingly an object of the present invention to develop means for controlling a nuclear reactor.

It is a more detailed object of the present invention to develop means for controlling heat cycles in a nuclear reactor.

It is a still more detailed object of the present invention to develop means for controlling front-to-rear heat and flux shifts in a nuclear reactor.

It is incidentally an object of the present invention to develop novel means for limiting the movement of the aforesaid control means.

These and other objects of the present invention are attained by incorporating a control column in one or more of the reactor process tubes and providing means for varying the horizontal displacement of the control column. The control column contains fewer fuel elements than are in a normal fuel column and control elements disposed at at least one end of the control column. According to the preferred embodiment control elements are disposed at both ends of the control column so the total length thereof is greater than that of a fuel column and the amount of fuel and poison are balanced so that movement of the control column varies the over-all reactivity balance of the reactor only slightly.

The invention will next be described by reference to the accompanying drawing wherein:

FIG. 1 is a diagrammatic sectional view of a portion of a nuclear reactor incorporating our invention, FIG. 2 is a sectional view taken on the line 2—2 in FIG. 1, FIG. 3 is a side view of the means for varying the horizontal displacement of the control column, FIG. 4 is an enlarged view of a portion of the control column shown in FIG. 1, FIG. 5 is a sectional view taken on the line 5—5 in FIG. 4, and FIG. 6 is a diagrammatic view taken through the micropotentiometer.

Referring now to the drawing, the nuclear reactor to which our invention appertains comprises a mass 10 of graphite, front and rear shields 11 and 12, process tubes 13 extending through the mass of graphite, inlet and outlet pipes 14 and 15 respectively communicating with the process tubes, fuel columns 16 disposed in most of the process tubes 13, and control columns 17 disposed in at least one process tube 13. Fuel columns 16 contain a plurality of aligned tubular fuel elements 18 while control columns 17 contain a lesser number of aligned tubular fuel elements 18 and also a plurality of tubular control elements 19 disposed at both ends of the column. The length of a fuel column 16 is approximately double the length of that portion of the control column 17 containing fuel elements 18.

According to a preferred form of the invention a fuel column 16 contains thirty 8-inch fuel elements 18 and a control column 17 contains fifteen 8-inch fuel elements 18 and twenty-three 4-inch control elements 19 at each end of the column. It is desirable that the number of control elements 19 at each end of the control column not be so great that they cannot be withdrawn into the shielding. The total length of a control column 17 is therefore greater than the total length of a fuel column 16.

Fuel elements 18 are formed of natural uranium jacketed in aluminum, while control elements 19 are formed of a material having a relatively high capture cross section for neutrons which is jacketed in aluminum. The control material is preferably one which transmutes to a useful isotope on capturing neutrons such as cobalt or lithium. Alternatively it may be a material which does not transmute to a useful isotope such as boron steel.

As is conventional both fuel columns 16 and control columns 17 rest on ribs 13A which extend inwardly from the walls of process tubes 13. In order to prevent galling of the fuel and control element jackets and of the ribs in the process tubes when the poison columns 17 are moved for reactor control, the fuel and control elements in the poison columns may be nickel-plated after flashing a thin layer of copper on the aluminum jacket of the elements. It has been found that a nickel plate of at least one and one half mills will eliminate problems arising from galling.

Control column 17 is moved against the flow of coolant water passing through process tubes 13 between inlet pipes 14 and outlet pipes 15 by a winch 20 located at the upstream end of the process tube. Winch 20 operates on control column 17 by means of cable 21 which passes through small diameter axial openings 22 and 23 respectively in fuel elements 18 and control elements 19 and terminates in a cable clamp 44 at the downstream end of the control column.

Referring more particularly to FIGS. 2 and 3, winch 20 is provided with an axial shaft 24 which connects the winch at one side to a motor 25 and at the other side to the shaft 26 of a micropotentiometer 27. Micropotentiometer 27 is a standard, high-precision, ten-turn linear potentiometer. Shaft 26 of micropotentiometer 27 is locked to shaft 24 of winch 20. Micropotentiometer 27 is not supported by any other means.

Micropotentiometer 27 consists of a housing 28 which contains a wiper arm 29 which traverses a resistance wire 30 integral with the housing, the limits of traverse being fixed by internal mechanical stops 31. The wiper is attached to shaft 26 and fits closely within housing 28.

As shown, a bar 32 is connected rigidly to the center of the end of housing 28. Springs 33 engage opposite sides of bar 32 to prevent the rotation of bar 32 when shaft 26 is rotated. Springs 33 are attached to limit switches 34. When the wiper attached to shaft 26 within the housing 28 hits an internal mechanical stop 31, shaft 26 ceases to rotate with respect to housing 28 and shaft 26, housing 28, and bar 32 rotate as a unit against a spring 33. Bar 32 thereby strikes one of the limit switches 34 shutting off power to the motor 25.

Thus the limit on the motion of the control column 17 is established by the internal mechanical stops in the micropotentiometer 27. When a ten-turn micropotentiometer is employed, the control column 17 can move a distance equal to ten turns of the winch 20. Obviously a potentiometer having a greater number of turns can be used to permit a greater displacement of the control column.

The position of the control column 17 within the process tube 13 can be indicated very simply by connecting a voltmeter to a source of voltage and to the wiper of the micropotentiometer 27. The voltmeter can be calibrated to indicate directly the position of the control column 17.

Operation of the control column 17 to control front-to-rear heat cycles in a nuclear reactor will next be described. If an abnormally high flux is detected near the downstream edge of the reactor, control column 17 is moved toward the upstream edge of the reactor by means of motor 25 and winch 20. This action shifts some of the control elements 19, which had been outside the fuel zone of the reactor, into the fuel zone of the reactor. The fuel portion of the control column 17 is shifted from the center of the reactor toward the upstream edge of the reactor. This action reduces reactivity near the downstream edge of the reactor and increases reactivity near the upstream edge of the reactor since an amount of control material equal to that being moved into the reactor at the downstream edge thereof is being removed at the upstream edge. Thus the over-all reactivity balance within the reactor is maintained relatively constant but the flux is shifted within the reactor by the movement of a single control element. To prevent the flux from being moved too far, the column is moved a short distance in the reverse direction after the graphite temperature starts to drop. A significant amount of front-to-rear control is thus obtained without disturbing the over-all power level an appreciable amount.

This invention represents the only known way to control front-to-rear heat and flux shifts. This desirable result is obtained without taking the process tube containing the control column out of service since the central portion of the control column produces plutonium and the control elements at each end of the column may produce another useful element.

Although the use of double-ended control elements has the special advantages above described, it will be appreciated that a control element containing a control material at only one end thereof can be useful not only for controlling heat cycles but also for routine fine control of the reactor. Although the invention has been described with reference to only one type of reactor, it can be applied to any reactor within which heat cycles occur.

It will be understood that the invention is not to be limited to the details given herein but that it may be modified within the scope of the appended claims.

What is claimed is:

1. In a nuclear reactor incorporating a plurality of columns of tubular fuel elements disposed in horizontal tubes in a mass of graphite wherein water flows through the tubes to cool the fuel elements, the improvement comprising at least one control column disposed in a horizontal tube including fewer fuel elements than in a normal column of fuel elements and tubular control elements disposed at both ends of said control column, and means for varying the horizontal displacement of the control column comprising a winch at the upstream end of the control column and a cable extending through the fuel and control elements and attached to the element at the downstream end of the column.

2. The improvement of claim 1 wherein the number of fuel elements in the control column is approximately one-half the number in a normal fuel column and the number of poison elements is sufficient so that the control column is longer than a normal fuel column.

3. The improvement according to claim 2 and including means for limiting the movement of the control column.

4. The improvement according to claim 3 wherein said means for limiting the movement of the control column includes a micropotentiometer having a shaft locked to the shaft of the winch, a housing having a resistance wire integral therewith, a wiper arm which is attached to the shaft of the micropotentiometer and which traverses the resistance wire, stops on said resistance wire which limit the movement of the wiper arm, a bar connected to the center of the end of the housing, a pair of springs engaging opposite sides of the bar, and limit switches which are operated by said bar when said springs are depressed.

* * * * *